(12) United States Patent
Kim

(10) Patent No.: US 12,744,257 B2
(45) Date of Patent: Sep. 22, 2026

(54) METHODS OF MASTER BATTERY UNIT AND MODULE BATTERY UNIT MANAGEMENT, AND BATTERY SYSTEM

(71) Applicant: SAMSUNG SDI CO., LTD., Yongin-si (KR)

(72) Inventor: Sunmin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 493 days.

(21) Appl. No.: 18/385,603

(22) Filed: Oct. 31, 2023

(65) Prior Publication Data

US 2024/0332645 A1 Oct. 3, 2024

(30) Foreign Application Priority Data

Mar. 27, 2023 (KR) ........................ 10-2023-0040014
Jun. 15, 2023 (KR) ........................ 10-2023-0077005

(51) Int. Cl.
*H01M 10/42* (2006.01)
*H01M 10/48* (2006.01)

(52) U.S. Cl.
CPC ....... *H01M 10/425* (2013.01); *H01M 10/482* (2013.01); *H01M 2010/4271* (2013.01); *H01M 2010/4278* (2013.01)

(58) Field of Classification Search
None
See application file for complete search history.

(56) References Cited

U.S. PATENT DOCUMENTS

| | | | |
|---|---|---|---|
| 8,898,341 | B2 | 11/2014 | Kim et al. |
| 8,963,507 | B2 | 2/2015 | Kim et al. |
| 2020/0169466 | A1 | 5/2020 | Kim |
| 2024/0055870 | A1 | 2/2024 | Yoon |

FOREIGN PATENT DOCUMENTS

| | | | |
|---|---|---|---|
| KR | 10-2018-0000535 | A | 1/2018 |
| KR | 10-2020-0061230 | A | 6/2020 |
| KR | 10-2022-0062887 | A | 5/2022 |
| KR | 10-2022-0093601 | A | 7/2022 |

OTHER PUBLICATIONS

Extended European Search Report dated Jul. 17, 2024 for corresponding EP Patent Application No. 24155743.8.

*Primary Examiner* — Colin W. Slifka
(74) *Attorney, Agent, or Firm* — Lee IP Law, P.C.

(57) ABSTRACT

A method of operating a module battery management unit includes randomly selecting one number from among assignable identification numbers in response to an identifier assignment command, assigning the selected number as a temporary identifier, transmitting a first message including the temporary identifier in response to an identifier transmission command, receiving messages transmitted by the other module battery management unit in response to the identifier transmission command, and checking identifiers of the other module battery management unit from the messages, comparing the temporary identifier with identifiers of the other module battery management unit in response to an identifier comparison command, assigning the temporary identifier as a final identifier if the temporary identifier does not overlap with identifiers of the other module battery management unit, and transmitting a second message including the final identifier to the serial communication bus in response to an identifier check command.

19 Claims, 12 Drawing Sheets

METHODS OF MASTER BATTERY UNIT AND MODULE BATTERY UNIT MANAGEMENT, AND BATTERY SYSTEM

CROSS-REFERENCE TO RELATED APPLICATION

The present application claims priority and the benefit of Korean Patent Application Nos. 10-2023-0040014, filed on Mar. 27, 2023, and 10-2023-0077005, filed on Jun. 15, 2023, in the Korean Intellectual Property Office, the entire disclosure of which is incorporated herein by reference.

BACKGROUND

1. Field

One or more embodiments relate to an operating method of a module battery management unit, an operating method of a master battery management unit, and a battery system.

2. Description of the Related Art

A battery management system (BMS) is a controller that monitors the state of a battery and manages a battery system including the battery to maintain and use the battery in optimal conditions. The BMS includes a plurality of battery modules and one master controller. The battery module includes a bundle of cells connected in series/parallel and a slave controller that measures the voltage of the cells and transmits the measured value to the master controller. The main functions of the slave controller include voltage measurement of individual cells, individual cell balancing, battery module temperature measurement, and battery module fault diagnosis.

In a conventional method, a master controller must be able to identify data transmitted from multiple slave controllers. Therefore, by assigning an identifier to identify each slave controller and transmitting data including the identifier, it should be possible to know the slave controller from which the data was transmitted. A method of including an identifier in data may vary depending on a communication protocol for transmitting and receiving data. For example, in controller area network (CAN) communication, the identifier may be included in the may identification (ID), and in a universal asynchronous receiver/transmitter (UART), the identifier may be included in data.

In a conventional method, if a plurality of slave controllers are used, a method of pre-storing identifiers (e.g., number 1 to number N) in the slave controller has been used. However, if the slave controller in this case needs to be assembled or replaced in one battery pack, since only the slave controller corresponding to the identifier assigned to the user should be replaced, mass productivity is lowered.

SUMMARY

Embodiments are directed to a method of operating a module battery management unit connected to a master battery management unit and at least one other module battery management unit through a serial communication bus. The method comprises receiving an identifier assignment command including assignable identifier information from the master battery management unit, randomly selecting one number from among assignable identification numbers according to the assignable identifier information in response to the identifier assignment command, and assigning the selected number as a temporary identifier, transmitting a first message including the temporary identifier through the serial communication bus in response to an identifier transmission command received from the master battery management unit; receiving messages transmitted by the at least one other module battery management unit in response to the identifier transmission command, and checking identifiers of the at least one other module battery management unit from the messages, comparing the temporary identifier with identifiers of the at least one other module battery management unit in response to an identifier comparison command received from the master battery management unit; and assigning the temporary identifier as a final identifier if the temporary identifier does not overlap with identifiers of the at least one other module battery management unit.

One or more embodiments provide a method and system for transmitting a second message including the final identifier to the serial communication bus in response to an identifier check command from the master battery management unit.

One or more embodiments provide a method and system for not assigning a final identifier in response to the identifier check command if the temporary identifier overlaps with identifiers of the at least one other module battery management unit.

One or more embodiments provide a method and system wherein the assignable identifier information comprises a plurality of bits, wherein bits having a first value, from among the plurality of bits, indicate numbers assigned as final identifiers to at least one other module battery management unit, from among the at least one other module battery management unit.

One or more embodiments provide a method and system wherein bits having a second value, from among the plurality of bits, indicate the assignable identification numbers.

In one or more embodiments, the method includes confirming whether the final identifier was assigned in response to the identifier assignment command, and performing the randomly selecting one number from among the assignable identification numbers only if the final identifier is confirmed as not assigned.

In one or more embodiments, the module battery management unit is included in a battery module that includes at least a battery cell, a plurality of terminals electrically coupled to the serial communication bus, and a protection circuit electrically coupling the battery cell and at least one of the plurality of terminals.

In one or more aspects, the module battery management unit detects state information of the battery cell and communicates the state information to the master battery management unit, the state information including at least one of a voltage, a charge current, a discharge current, and a temperature.

In one or more embodiments, the master battery management unit includes at least one microcontroller, the at least one microcontroller including a processor and a memory storing instructions for operating the module battery management unit, the instructions being executable in the processor.

According to one or more embodiments, a method of operating a module battery management unit connected to a master battery management unit and at least one other module battery management unit through a serial communication bus, includes receiving an identifier assignment command including assignable identifier information from the master battery management unit, randomly selecting one number from among assignable identification numbers according to the assignable identifier information in response to the identifier assignment command, and assigning the selected number as a temporary identifier, transmitting a first message including the temporary identifier through the serial communication bus in response to an identifier transmission command received from the master battery management unit, receiving messages transmitted by the at least one other module battery management unit in response to the identifier transmission command, and checking identifiers of the at least one other module battery management unit from the messages, comparing the temporary identifier with identifiers of the at least one other module battery management unit in response to an identifier comparison command received from the master battery management unit, assigning the temporary identifier as a final identifier if the temporary identifier does not overlap with identifiers of the at least one other module battery management unit, and transmitting a second message including the final identifier to the serial communication bus in response to an identifier check command from the master battery management unit.

According to some embodiments, the method may further include not assigning a final identifier in response to the identifier check command if the temporary identifier overlaps with identifiers of the at least one other module battery management unit.

According to another embodiment, the assignable identifier information may include a plurality of bits, wherein bits having a first value, from among the plurality of bits, indicate numbers assigned as final identifiers to at least one other module battery management unit, from among the at least one other module battery management unit, and wherein bits having a second value, from among the plurality of bits, indicate the assignable identification numbers.

According to another embodiment, the method may further include confirming whether the final identifier was assigned in response to the identifier assignment command, wherein the randomly selecting one number from among the assignable identification numbers if the final identifier is not assigned.

According to one or more embodiments, an operating method of a master battery management unit connected to a plurality of module battery management units through a serial communication bus, includes transmitting a first identifier assignment command including first assignable identifier information indicating assignable identification numbers to the plurality of module battery management units, transmitting an identifier transmission command to the plurality of module battery management units, receiving messages transmitted by the other module battery management units in response to the identifier transmission command, sequentially transmitting an identifier comparison command and an identifier check command to the plurality of module battery management units, receiving messages transmitted by at least some of the module battery management units to which a final identifier is assigned, from among the plurality of module battery management units, in response to the identifier check command, and checking final identifiers of the at least some of the module battery management units from the messages, generating second assignable identifier information excluding identification numbers corresponding to final identifiers of the at least some module battery management units from the assignable identification numbers.

According to some embodiments, the method includes transmitting a second identifier assignment command including the second assignable identifier information to the plurality of module battery management units.

According to some embodiments, the method may further include, responsive to transmitting the identifier check command, if the number of messages received from the plurality of module battery management units is equal to the number of the plurality of module battery management units, terminating an identifier assignment operation.

According to another embodiment, the first and second assignable identifier information may each include a plurality of bits, wherein bits having a first value, from among the plurality of bits, indicate identification numbers corresponding to final identifiers of at least some module battery management units to which the final identifiers are assigned, from among the plurality of module battery management units.

According to another embodiment, bits having a second value, from among the plurality of bits, indicate identification numbers that can be assigned by at least some module battery management units to which the final identifier is not assigned, from among the plurality of module battery management units.

According to one or more embodiments, a battery system includes a plurality of module battery management units respectively connected to nodes of a serial communication bus, each of the plurality of module battery management units configured to randomly select one number from among assignable identification numbers according to assignable identifier information in response to an identifier assignment command received, and to assign the selected number as a temporary identifier. A master battery management unit is connected to a serial communication bus, and is configured to transmit an identifier assignment command including the assignable identifier information to the plurality of module battery management units, and to transmit an identifier transmission command to the plurality of module battery management units. The master battery management unit is further configured to transmit an identifier comparison command to the plurality of module battery management units, to compare the temporary identifier with identifiers of the other module battery management units in response to an identifier comparison command, and if the temporary identifier does not overlap with the identifiers of the other module battery management units, to assign the temporary identifier as a final identifier.

In some aspects, each of the plurality of module battery management units is configured to transmit a first message including the temporary identifier in response to the identifier transmission command, receive messages transmitted by the other module battery management units, and check identifiers of the other module battery management units from the messages.

In some embodiments, the master battery management unit is further configured to transmit an identifier check command to the plurality of module battery management units.

In some embodiments, each of the plurality of module battery management units is further configured to transmit a second message including the final identifier in response to the identifier check command.

According to some embodiments, the battery system may further include a plurality of battery modules, wherein each of the plurality of battery modules includes at least one battery cell, a protection circuit configured to protect the at least one battery cell, and the module battery management unit is further configured to control the protection circuit by monitoring a state of the at least one battery cell.

According to another embodiment, the module battery management unit detects state information of the at least one battery cell and communicates the state information to the master battery management unit, the state information including at least one of a voltage, a charge current, a discharge current, and a temperature.

In some aspects, the protection circuit includes one or more of a charge control switch, a discharge control switch, a main switch, a precharge switch, and a fuse.

According to some embodiments, the master battery management unit includes at least one microcontroller, the at least one microcontroller including a processor and a memory storing instructions for operating the module battery management unit, the instructions being executable in the processor.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
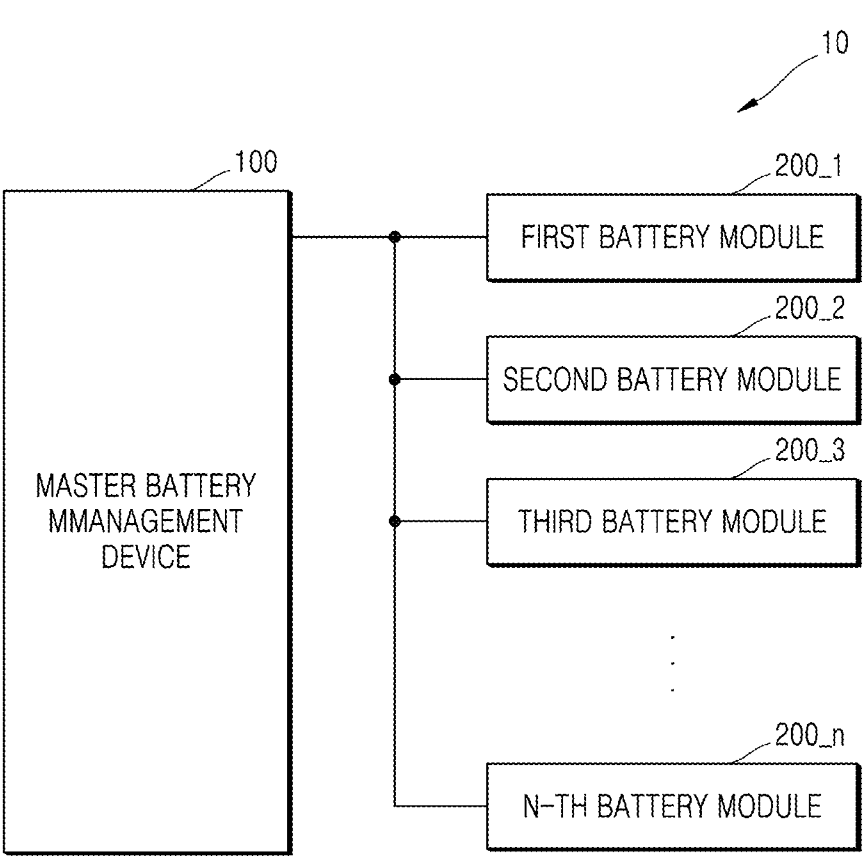
FIG. 1 is a block diagram schematically showing a battery system according to embodiments.

Example embodiments will now be described in more detail below with reference to the accompanying drawings. However, the inventive concept may be embodied in many forms and should not be construed as limited to the embodiments set forth herein. Rather, these embodiments are provided so that this disclosure will be complete and comprehensive, and will fully convey the illustrative implementations to those skilled in the art.

The terms used in the present application are used only to describe certain embodiments, and are not intended to limit the inventive concept. The terms of a singular form may include plural forms unless otherwise specified. In this specification, the term "include," "comprise," "including," or "comprising," specifies a property, a region, a fixed number, a step, a process, an element and/or a component but does not exclude other properties, regions, fixed numbers, steps, processes, elements and/or components. It will be understood that the terms "first" and "second" are used herein to describe various components but these components should not be limited by these terms. The above terms are used only to distinguish one component from another.

Hereinafter, embodiments will be described more completely with reference to the accompanying drawings in which embodiments are shown. Like reference numbers throughout indicate like elements. In the drawings, identical or corresponding components are assigned the same reference numerals, and will not be described redundantly.

FIG. 1 schematically shows a battery system from a power source point of view, according to some embodiments.

Referring to FIG. 1, a battery system 10 may include a master battery management device 100 and battery modules 200_1 to 200_*n* each coupled to the master battery management device.

The battery modules 200_1 to 200_*n* may be collectively referred to as the battery module 200. The battery module 200 includes at least one battery cell and a module battery management unit for managing the battery cell.

The battery system 10 is an integral energy storage system for supplying power to battery cells of the battery module 200 and outputting power stored in the battery cells. The battery system 10 may be connected to a battery charging system (a so-called battery charging station) for charging the battery cells of the battery module 200. The battery system 10 may be connected to an electric load to be supplied with power stored in battery cells of the battery module 200.

The master battery management device 100 is configured to manage the battery system 10 and may include, for example, a micro control unit (MCU). The master battery management device 100 may perform data communication with the module battery management units and provide state information of the battery system 10 collected through the module battery management units to an external device.

The battery module 200 may include at least one battery cell and a module battery management unit. The at least one battery cell may include a rechargeable secondary battery. For example, the at least one battery cell may include nickel-cadmium batteries, lead-acid batteries, nickel-metal hydride batteries (NiMH), lithium-ion batteries, and lithium polymer batteries, and the like. The at least one battery cell may be connected to each other in series, parallel or a combination of series and parallel, and the number of the at least one battery cell may be determined according to an output voltage required for the battery module 200.

The battery module 200 may further include a protection circuit. The protection circuit is a circuit for protecting a battery cell and may include a charge control switch, a discharge control switch, a fuse, and the like. The module battery management unit may monitor the state of the battery cell, control the protection circuit, and transmit the state of the battery cell to the master battery management device 100.

The master battery management device 100 may perform a protection operation to protect the battery system 10 based on state information of the battery system 10. To this end, the battery system 10 may include a protection circuit controlled by the master battery management device 100.

Figure 2:
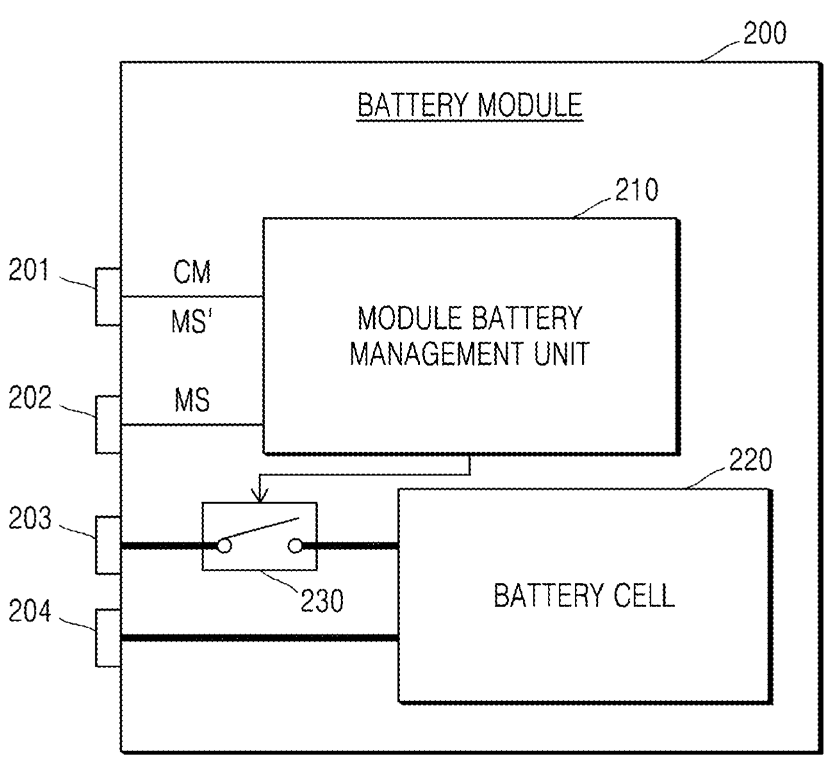
FIG. 2 is a block diagram showing an internal configuration of a battery module according to embodiments.

FIG. 2 schematically shows the internal configuration of a battery module according to some embodiments.

Referring to FIG. 2, an internal configuration of any one battery module 200 among the battery modules 200 of FIG. 1 is shown in an example.

The battery module 200 includes a module battery management unit 210 and at least one battery cell 220. As shown in FIG. 2, the battery module 200 may further include a protection circuit 230.

The battery module 200 may be connected to the serial communication bus through the first terminal 201 and the second terminal 202. The first terminal 201 is connected to the receiver of the module battery management unit 210, and the module battery management unit 210 may receive a command CM from the master battery management device 100 (see FIG. 1) through the first terminal 201. Also, the module battery management unit 210 may receive a message MS' transmitted by another battery module management unit 210 through the first terminal 201.

The second terminal 202 is connected to the transmitter of the module battery management unit 210, and the module battery management unit 210 may transmit a message MS to the master battery management device 100 through the second terminal 202.

The module battery management unit 210 may be activated in response to a command CM from the master battery management device 100 received through the first terminal 201 and may assign a temporary identifier or a final identifier to itself. The module battery management unit 210 may transmit a message MS including a temporary identifier or a final identifier to the serial communication bus through the second terminal 202. Among the messages MS, a message transmitted by the module battery management unit 210 in response to an identifier transmission command from the master battery management device 100 is referred to as a first message tIDm. The first message tIDm includes a temporary identifier or a final identifier. Among the messages MS, a message transmitted by the module battery management unit 210 in response to an identifier check command from the master battery management device 100 is referred to as a second message fIDm. The second message fIDm includes the final identifier. The module battery management unit 210 may communicate with the master battery management device 100 using a temporary identifier or a final identifier.

A protection circuit 230 may be positioned between the battery cell 220 and at least one 203 (in the example of FIG. 2) of the terminals 203 and 204. The protection circuit 230 may include at least one switch controlled by the module battery management unit 210. The protection circuit 230 may include at least one of a charge control switch, a discharge control switch, a main switch, and a precharge switch. The protection circuit 230 may include a fuse.

Figure 3:
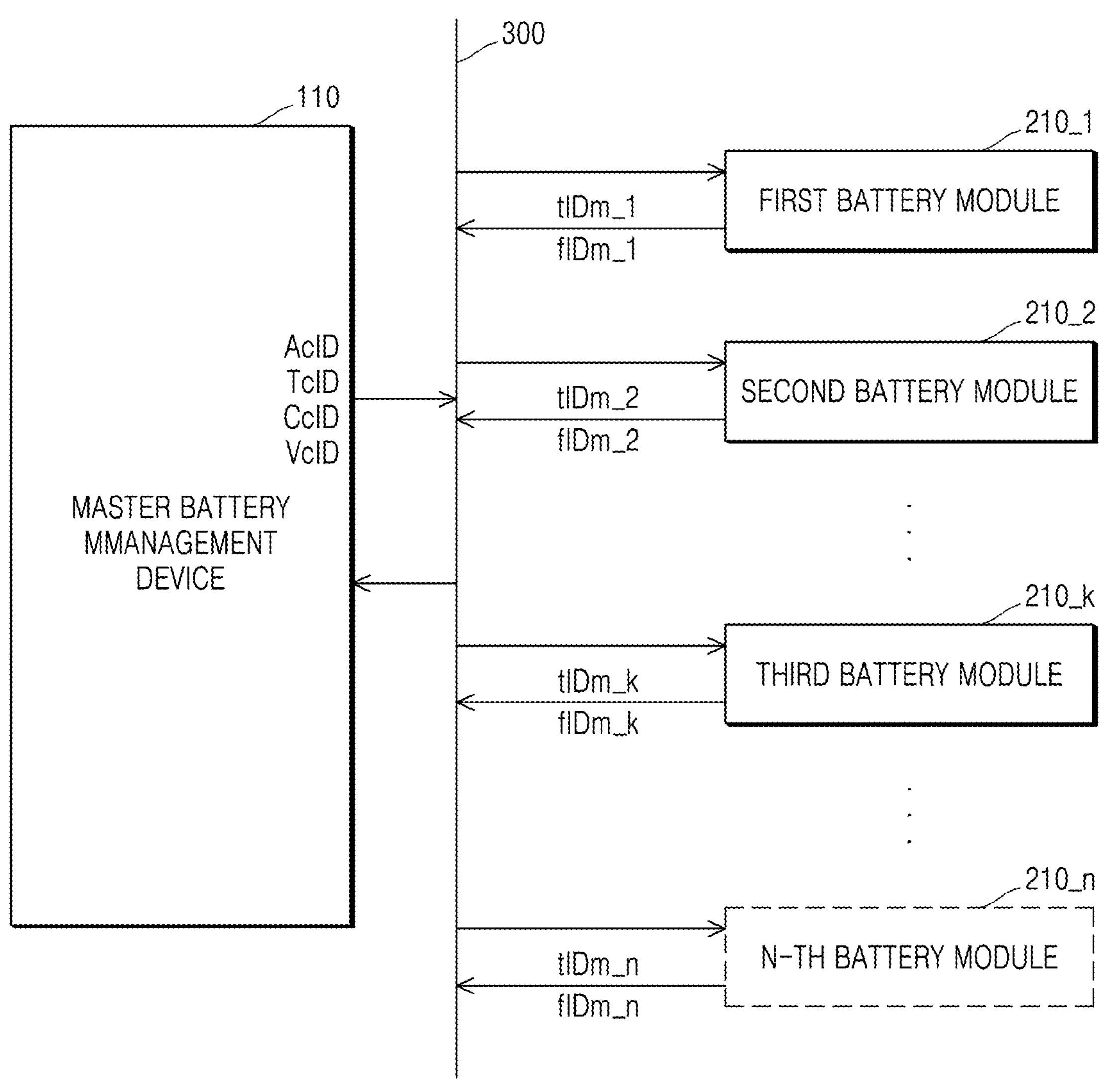
FIG. 3 is a block diagram showing a battery system from a communication point of view according to embodiments.

FIG. 3 schematically shows a battery system according to some embodiments from a communication point of view.

Referring to FIG. 3, the master battery management unit 110 and the plurality of module battery management units 210_1 to **210_*n* may perform data communication through the serial communication bus 300**.

It is assumed that final identifiers are not assigned to the first to k-th module battery management units 200_1 to **200_*k* among the total number of n module battery management units 210_1 to 210_*n*, and identifiers are assigned to the (k+1)-th module battery management units to the n-th module battery management units 200_**(*k*+1) to **200_*n*. k may be a natural number greater than 1** and smaller than n.

The master battery management unit 110 may be included in the master battery management device 100 of FIG. 1 and may control the operation of the master battery management device 100 as a whole. The master battery management unit 110 may be an integrated controller of the master battery management device 100. The master battery management unit 110 may include one or more microcontrollers.

The master battery management unit 110 may communicate with the module battery management units 210_1 to **210_*n* through the serial communication bus 300. The master battery management unit 110 may transmit identifier commands for allowing the module battery management units 210_1 to 210_*n* to assign themselves different final identifiers to the module battery management units 210, and receive messages transmitted by the module battery management units 210_1 to 210_*n* through the serial communication bus 300**. The identifier commands may include an identifier assignment command AcID, an identifier transmission command TcID, an identifier comparison command CcID, and an identifier check command VcID.

The plurality of module battery management units 210_1 to **210_*n* are respectively included in the battery modules 200_1 to 200_*n* of FIG. 1. The plurality of module battery management units 210_1 to 210_*n* may be collectively referred to as the module battery management unit 210. The module battery management unit 210 detects states (e.g., voltage, charge/discharge current, temperature, etc.) of battery cells of the battery module and transmits the detected state information to the master battery management unit 110**.

The module battery management units 210 may be connected to nodes of the serial communication bus 300 and communicate with the master battery management unit 110 through the serial communication bus 300. The module battery management unit 210 may perform an operation according to a command in response to a command from the master battery management unit 110. A default identifier such as 0x1FF may be assigned to the module battery management unit 210 before assigning the identifier.

The module battery management unit 210 may check whether the final identifier has been assigned in response to an identifier assignment command AcID from the master battery management unit 110. If the final identifier is not assigned, the module battery management unit 210 may randomly select one number among assignable identification numbers and assign the selected number as a temporary identifier. According to the example of FIG. 3, since final identifiers are not assigned to the first module battery management unit to the k-th module battery management unit 210_1 to **210_*k*, each of the first module battery management units to the k-th module battery management units 210_1 to 210_*k* randomly may select one number among assignable identification numbers, and assign a temporary identifier based on the selected number. For example, if the number randomly selected by the first module battery management unit 210_1 is '3', '0x103' may be assigned as a temporary identifier. The temporary identifier of the first module battery management unit 210_1 is indicated as a first temporary identifier tID_1. If the number randomly selected by the second module battery management unit 210_2** is '10', '0x10A' may be assigned as a temporary identifier.

The module battery management unit 210 may transmit a first message tIDm through the serial communication bus 300 in response to an identifier transmission command TID from the master battery management unit 110. The first to k-th module battery management units 210_1 to 210_*k* to which the final identifier is not assigned may transmit first messages tIDm_1 to tIDm_k including its temporary identifier tID through the serial communication bus 300. The (k+1)-th to n-th module battery management units 210_(*k*+1) to 210_*n* to which the final identifiers are assigned may transmit first messages tIDm_(k+1) to tIDm_n including their final identifiers through the serial communication bus 300.

For example, the temporary identifiers tID included in the first messages tIDm_1 to tIDm_k transmitted by the first to k-th module battery management units 210_1 to 210_*k* may be duplicated.

Since the module battery management unit 210 is connected to the serial communication bus 300, first and second messages tIDm and fIDm transmitted by other module battery management units may be received. The module battery management unit 210 may receive first messages tIDm transmitted by other module battery management units in response to an identifier transmission command TcID, and check identifiers of other module battery management units from the first messages tIDm. According to the example of FIG. 3, the first module battery management unit 210_1 may receive first messages tIDm_2 to tIDm_n transmitted by other module battery management units 210_2 to 210_*n* and check identifiers included in the first messages tIDm_2 to tIDm_n.

The module battery management unit 210 may compare its own temporary identifier with identifiers of other module battery management units in response to the identifier comparison command CcID from the master battery management unit 110. If its own temporary identifier does not overlap with identifiers of other module battery management units, the module battery management unit 210 may assign the temporary identifier as a final identifier fID. If the temporary identifier of the module battery management unit 210 overlaps with identifiers of other module battery management units, the module battery management unit 210 may not assign the final identifier fID. According to the example of FIG. 3, the first module battery management unit 210_1 may check whether its first temporary identifier tID_1 overlaps with identifiers included in the first messages tIDm_2 to tIDm_n received from other module battery management units 210_2 to 210_*n*. If the first temporary identifier tID_1 of the first module battery management unit 210_1 does not overlap with identifiers of other module battery management units 210_2 to 210_*n*, the first module battery management unit 210_1 may assign the first temporary identifier tID_1 as the final identifier of the first module battery management unit 210_1. The final identifier of the first module battery management unit 210_1 may be indicated as the first final identifier fID_1. If the first temporary identifier tID_1 of the first module battery management unit 210_1 overlaps with identifiers of other module battery management units 210_2 to 210_*k*, the first module battery management unit 210_1 may not assign a final identifier.

At least some of the first to k-th module battery management units 200_1 to 200_*k* may assign final identifiers. If numbers randomly selected by the first to k-th module battery management units 200_1 to 200_*k* among assignable identification numbers are all different, all of the first to k-th module battery management units 200_1 to 200_*k* may assign final identifiers. If numbers randomly selected by the first to k-th module battery management units 200_1 to 200_*k* among assignable identification numbers are the same, all of the first to k-th module battery management units 200_1 to 200_*k* may not assign final identifiers.

The module battery management unit 210 may transmit the second message fIDm including the final identifier fID through the serial communication bus 300 in response to the identifier check command VcID from the master battery management unit 110. According to the example of FIG. 3, among the first module battery management units to the n-th module battery management units 210_1 to 210_*n*, the module battery management units to which the final identifier is assigned may transmit the second message fIDm including the final identifier through the serial communication bus 300. For example, if the first module battery management unit 210_1 assigns the final identifier, the first module battery management unit 210_1 may transmit the second message fIDm_1 including the first final identifier fID_1 of the first module battery management unit 210_1 through the serial communication bus 300.

The master battery management unit 110 may receive the second message fIDm from the module battery management units 210 after transmitting the identifier check command VcID, and may perform processing according to a predesigned algorithm. If the number of second messages fIDm received from the plurality of module battery management units 210 is equal to the number of the plurality of module battery management units 210, it is determined that all of the plurality of module battery management units 210 have assigned final identifiers, and the identifier assignment operation may be terminated. If the number of second messages fIDm2 received from the plurality of module battery management units 210 is smaller than the number of the plurality of module battery management units 210, the master battery management unit 110 may re-execute an identifier assignment operation so that module battery management units that have not assigned final identifiers may assign final identifiers.

According to the example of FIG. 3, if the number of second messages fIDm received from the n module battery management units 210_1 to 210_*n* is n, the master battery management unit 110 may end the identifier assignment operation. If the number of second messages fIDm received from the module battery management units 210_1 to 210_*n* is less than n, the master battery management unit 110 may re-execute the identifier assignment operation.

Controller area network (CAN) communication may be used as a communication protocol between the master battery management unit 110 and the module battery management unit 210 and between the plurality of module battery management units 210. For example, the serial communication bus 300 may be a CAN bus and may communicate with the master battery management unit 110 and other module battery management units 210 through the CAN bus. The master battery management unit 110 is connected to the CAN bus, and the module battery management units 210 are respectively connected to nodes of the CAN bus.

According to another embodiment, universal asynchronous receiver/transmitter (UART) communication may be used as a communication protocol between the master battery management unit 110 and the module battery management unit 210 and between the plurality of module battery management units 210. However, the inventive concept is not limited thereto, and any communication protocol that transmits data or commands using a bus line may be applied.

Figure 4:
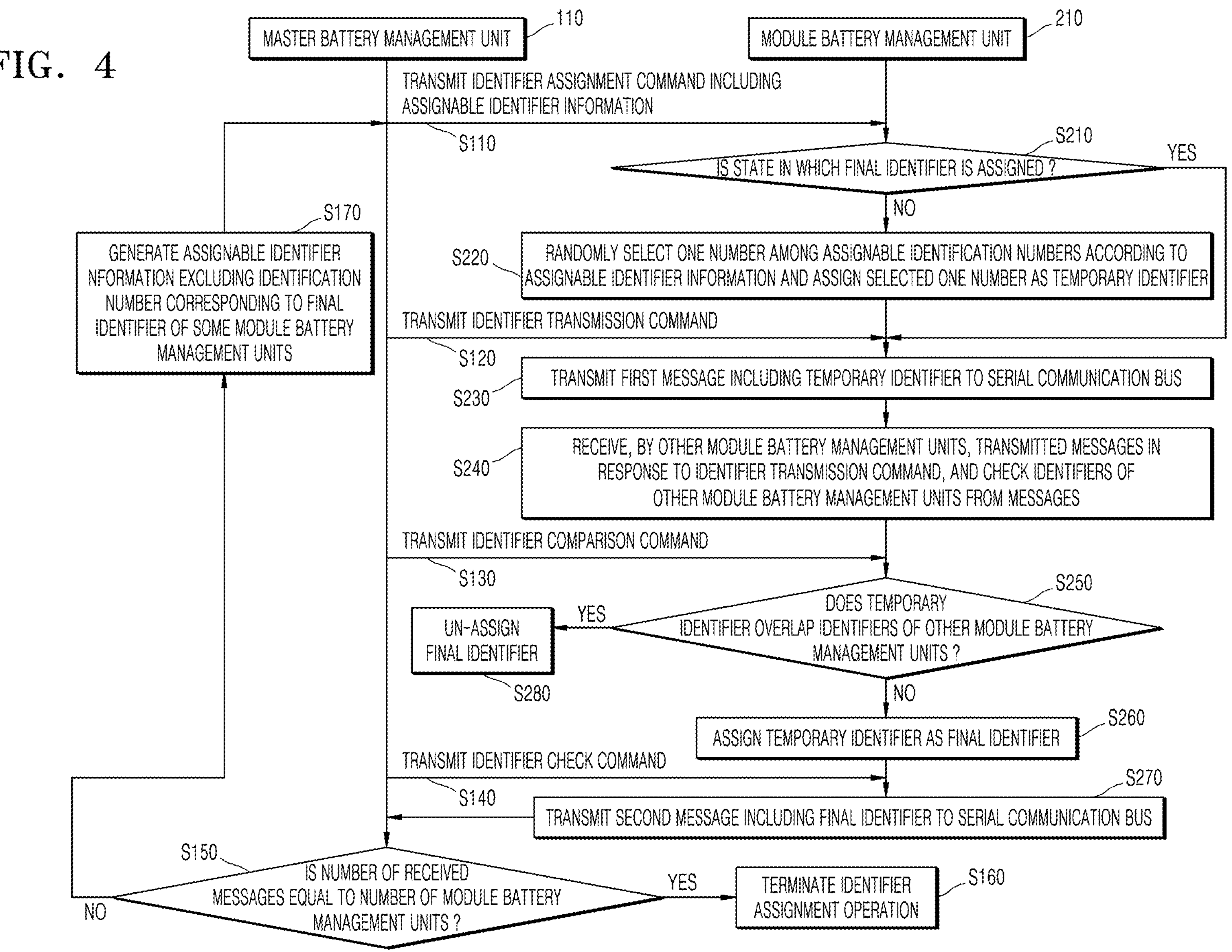
FIG. 4 is a logic flow diagram showing sequential operations of a master battery controller and a module battery controller for assigning a final identifier to a module battery management unit, according to some embodiments.

FIG. 4 shows operations of a master battery controller and a module battery controller in sequence for assigning a final identifier to the module battery controller according to some embodiments.

Referring to FIG. 4, a master battery management unit 110 and a module battery management unit 210 are illustrated as an example.

The master battery management unit 110 is included in the master battery management device 100 of FIG. 1 and may function as a master. The module battery management unit 210 is included in the battery module of FIG. 1 and may function as a slave to the master battery management unit 110.

The master battery management unit 110 may transmit an identifier assignment command including assignable identifier information to the module battery management unit 210 in operation S110. The assignable identifier information represents assignable identification numbers that the module battery management unit 210 may assign as final identifiers. For example, assignable identifier information in operation S110 is referred to as first assignable identifier information to be distinguished from assignable identifier information in operation S170 performed after operations S120 to S150.

The module battery management unit 210 may check whether the final identifier has been assigned in response to an identifier assignment command from the master battery management unit 110 in operation S210. If the final identifier is not assigned, in response to the identifier assignment command, the module battery management unit 210 may randomly select one number among assignable identification numbers according to assignable identifier information and assign a temporary identifier corresponding to the selected number in operation S220. The module battery management unit 210 may determine a temporary identifier corresponding to the selected number and change a default identifier (e.g., 0x1FF) to a temporary identifier.

If the module battery management unit 210 is in a state of assigning the final identifier, operation S220 may be omitted. According to another example, if the final identifier is assigned, the module battery management unit 210 may transmit a second message including the final identifier to the serial communication bus according to the identifier check command from the master battery management unit 110 of operation S140 in operation S270.

The master battery management unit 110 may transmit an identifier transmission command to the module battery management unit 210 in operation S120. The identifier transmission command may be a command to transmit a message to the serial communication bus using the temporary identifier assigned to the module battery management unit 210. According to the identifier transmission command, the plurality of module battery management units 210 may share temporary identifiers assigned to the plurality of module battery management units 210 with other module battery management units 210 through a serial communication bus.

The module battery management unit 210 may transmit a first message including the temporary identifier through the serial communication bus in response to the identifier transmission command in operation S230. At this time, the module battery management unit 210 to which the final identifier is assigned may transmit a message including the final identifier to the serial communication bus. According to another example, the module battery management unit 210 to which the final identifier is assigned may not respond to the identifier transmission command.

The module battery management unit 210 may receive messages transmitted by other module battery management units 210 in response to an identifier transmission command and check the identifiers of the other module battery management units 210 from the messages in operation S240.

The master battery management unit 110 may transmit an identifier comparison command to the module battery management unit 210 in operation S130.

In response to the identifier comparison command from the master battery management unit 110, the module battery management unit 210 may determine whether its own temporary identifier overlaps with identifiers of other module battery management units 210 in operation S250. If the temporary identifier does not overlap with identifiers of other module battery management units 210, the module battery management unit 210 may assign the temporary identifier as a final identifier in operation S260.

If its temporary identifier overlaps with identifiers of other module battery management units 210, the module battery management unit 210 may not assign the final identifier in response to the identifier check command in operation S280. Although not shown in FIG. 2, operation S170 may be executed after operation S280.

The master battery management unit 110 may transmit an identifier check command to the module battery management unit 210 in operation S140. The identifier check command may be delivered to all module battery management units 210 included in the battery system. If the module battery management unit 210 assigns the final identifier, in response to the identifier check command from the master battery management unit 110, a second message including the final identifier may be transmitted through the serial communication bus in operation S270. If the module battery management unit 210 does not assign the final identifier, a message may not be transmitted in response to an identifier check command from the master battery management unit 110.

The master battery management unit 110 may determine whether the number of second messages received from the module battery management units 210 is equal to the number of module battery management units 210 in operation S150. If the master battery management unit 110 determines that the number of second messages received from the module battery management units 210 is equal to the number of module battery management units 210, the identifier assignment operation may end in operation S160.

If the master battery management unit 110 determines that the number of messages received from the module battery management units 210 is not equal to the number of module battery management units 210, by excluding the identification number corresponding to the final identifier of the module battery management units 210 that assigned the final identifier from the assignable identification numbers of the first assignable identifier information, new assignable identifier information may be generated in operation S170. For example, the assignable identifier information generated in operation S170 is referred to as second assignable identifier information to be distinguished from the first assignable identifier information in operation S110. The operations S110 to S170 of the master battery management unit 110 and the operations S210 to S280 of the module battery management unit 210 may be repeated as described above until the final identifier is assigned to all module battery management units 210.

FIG. 5 schematically shows an example in which a final identifier is assigned to only one module battery management unit among a plurality of module battery management units according to some embodiments. In FIG. 5, among the plurality of module battery management units, the module battery management unit to which a final identifier is assigned may be indicated by a dotted line, and the module battery management unit to which a final identifier is not assigned may be indicated by a solid line.

Figure 5A:
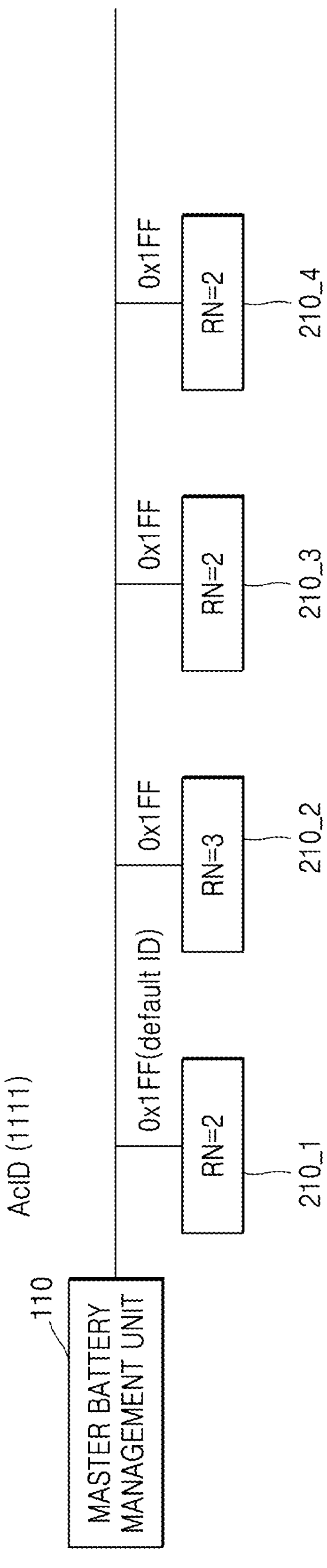
FIG. 5A is a block diagram showing an example of selecting a random number according to an identifier assignment command of a master battery management unit, according to embodiments.

FIG. 5A schematically shows an example of selecting a random number according to an identifier assignment command of a master battery management unit according to some embodiments.

Referring to FIG. 5A, the master battery management unit 110 may transmit an identifier assignment command AcID to four module battery management units 210_1 to 210 4. The module battery management unit 210 may assign a default identifier such as 0x1FF before a temporary identifier or a final identifier is assigned. The identifier assignment command AcID may include assignable identifier information (e.g., '1111') including a plurality of bits. Bits having a first value among the plurality of bits may indicate numbers assigned as final identifiers to at least one other module battery management unit among the other module battery management units 210. For example, the first value may be 0. Bits having a second value among the plurality of bits may represent assignable identification numbers. For example, the second value may be 1.

According to FIG. 5A, if the master battery management unit 110 transmits an identifier assignment command AcID including '1111' as assignable identifier information to the four module battery management units 210_1 to 210_4, an assignable identification number according to the identifier assignment command AcID may be a natural number from 1 to 4. The identifier assignment command AcID may be a command that randomly selects one number among the assignable identification numbers and assign the one number as a temporary identifier for each of the first module battery management unit 210_1, the second module battery management unit 210_2, the third module battery management unit 210_3, and the fourth module battery management unit 210_4. In FIG. 5A, according to the identifier assignment command AcID that includes '1111' as assignable identifier information, each module battery management unit 210 may randomly select 2 for the first module battery management unit 210_1, 3 for the second module battery management unit 210_2, 2 for the third module battery management unit 210_1, and 2 for the fourth module battery management unit 210_2, as identification numbers RN, respectively.

Figure 5B:
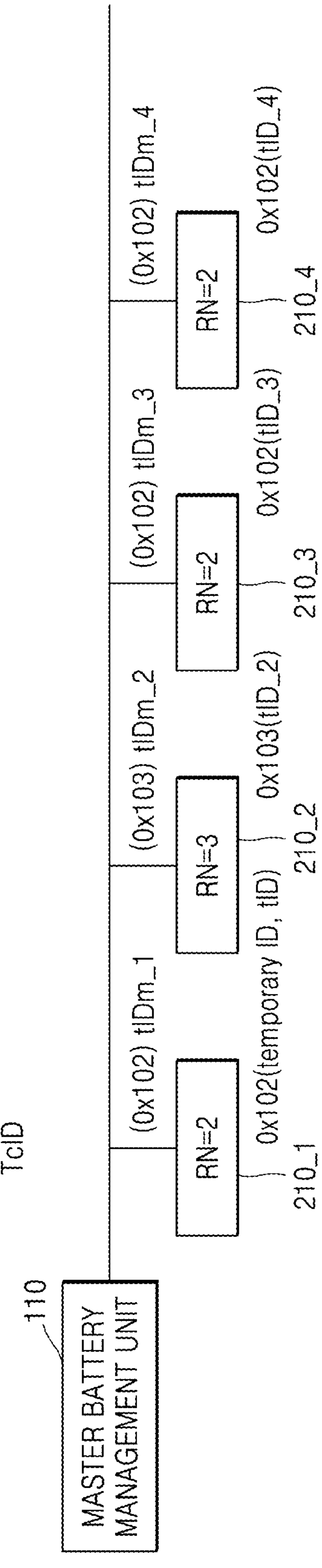
FIG. 5B is a block diagram showing an example of assigning a temporary identifier according to an identifier transmission command of a master battery management unit, according to embodiments.

FIG. 5B schematically shows an example of assigning a temporary identifier according to an identifier transmission command of a master battery management unit according to some embodiments.

Referring to FIG. 5B, in FIG. 5A, as the four module battery management units 210_1 to 210_4 randomly select the identification numbers RN, the first module battery management unit 210_1 may assign '0x102', the second module battery management unit 210_2 may assign '0x103', the third module battery management unit 210_3 may assign '0x102' and the fourth module battery management unit 210_4 may assign '0x102' may assign '0x103' as temporary IDs tID, respectively.

The master battery management unit 110 may transmit an identifier transmission command TcID to the four module battery management units 210_1 to 210_4. The module battery management units 210 may transmit the first message including the assigned temporary identifier to the serial communication bus. For example, the first message may include a temporary identifier tID or a final identifier fID. The first module battery management unit 210_1 may transmit a first message tIDm_1 including 0x102' as a temporary identifier, the second module battery management unit 210_2 may transmit a first message tIDm_2 including '0x103' as a temporary identifier, the third module battery management unit 210_3 may transmit a first message tIDm_3 including '0x102' as a temporary identifier, and the fourth module battery management unit 210_4 may transmit the first message tIDm_4 including '0x102' as a temporary identifier through the serial communication bus.

Each of the module battery management units 210 may receive the first message tIDm_1 to tIDm_4 from each other through a serial communication bus, and check temporary identifiers 0x102 and 0x103 included in the first messages tIDm_1 to tIDm_4.

Figure 5C:
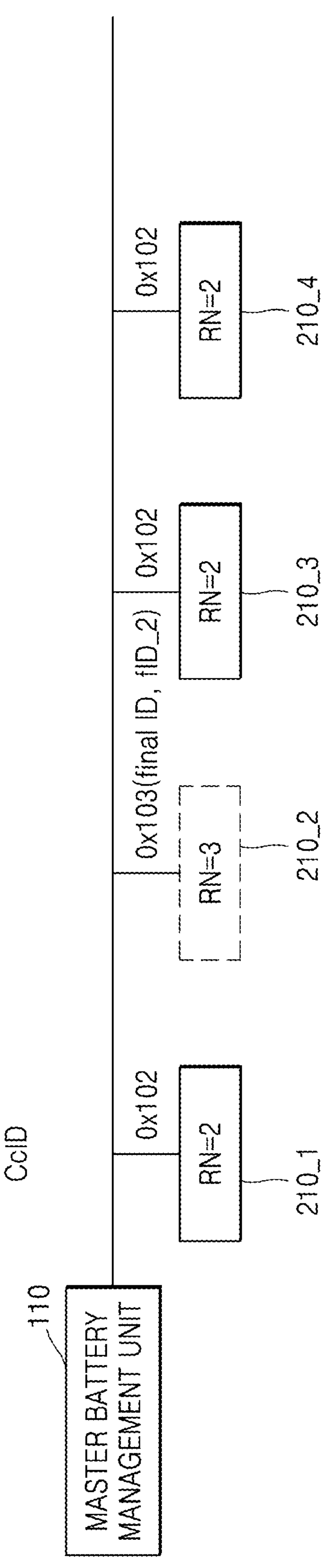
FIG. 5C is a block diagram showing an example of a battery system according to an identifier comparison command of a master battery management unit, according to embodiments.

FIG. 5C schematically shows an example of a battery system according to an identifier comparison command of a master battery management unit according to some embodiments.

Referring to FIG. 5C, the master battery management unit 110 may transmit an identifier comparison command CcID to four module battery management units 210_1 to 210_4. In response to an identifier comparison command CcID, each of the module battery management units 210 may compare whether the temporary identifier assigned to the module battery management unit 210 overlaps with the identifiers of other module battery management units. If the temporary identifier does not overlap with identifiers of other module battery management units, the temporary identifier may be assigned as a final identifier. According to FIG. 5C, in the second module battery management unit 210_2 assigning '0x103' as a temporary identifier, since the temporary identifier '0x102' included in the first message received from the other module battery management units 210_1, 210_3, and 210_4 does not overlap with the temporary identifier '0x103' of the second module battery management unit 210_2, '0x103' may be assigned as the final identifier fID_2. Among the first messages tIDm_1 to tIDm_4 received from different module battery management units, since the temporary identifiers '0x102' included in some of the first messages tIDm_1, tIDm_3, and tIDm_4 overlap with the temporary identifiers '0x102' of the first, third, and fourth module battery management units 210_1, 210_3, and 210_4, the first, third, and fourth module battery management units 210_1, 210_3, and 210_4 that have assigned '0x102' as a temporary identifier may not assign '0x102' as a final identifier.

Figure 5D:
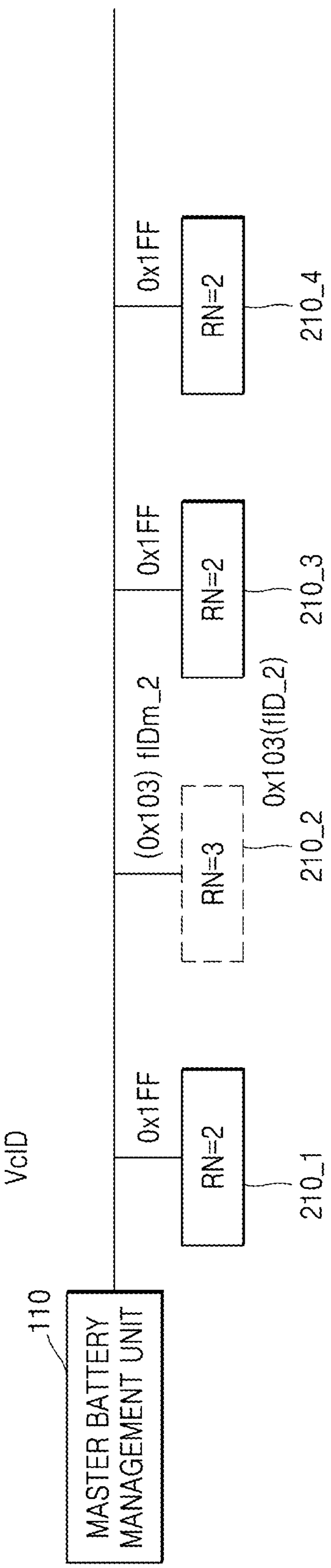
FIG. 5D is a block diagram showing an example of assigning a final identifier according to an identifier check command of a master battery management unit, according to some embodiments.

FIG. 5D schematically shows an example of assigning a final identifier according to an identifier check command of a master battery management unit according to some embodiments.

Referring to FIG. 5D, the master battery management unit 110 may transmit an identifier check command VcID to the four module battery management units 210_1 to 210_4. The master battery management unit 110 may receive the second message fIDm from the module battery management unit to which the final identifier fID is assigned. According to FIG. 5C, among the four module battery management units 210_1 to 210_4, the second module battery management unit 210_2 assigns '0x103' as the final identifier fID_2, the master battery management unit 110 may receive one second message fIDm_2 including '0x103' as a final identifier from the second module battery management unit 210_2. The master battery management unit 110 may initialize the identifier by changing the temporary identifiers of the first module battery management unit, the third module battery management unit, and the fourth module battery management unit 210_1, 210_3, and 210_4 to which the final identifier fID has not been assigned to a default identifier value (e.g., '0x1FF'). Since the master battery management unit 110 receives one second message fIDm_2 from the second module battery management unit 210_2 among the four module battery management units 210_1 to 210_4, the master battery management unit 110 may then perform an identifier assignment task.

Then, the identifier assignment task will be described in detail in FIG. 6.

FIG. 6 schematically shows an example in which final identifiers are assigned to all of the plurality of module battery management units according to the continuous embodiment of FIG. 5.

In FIG. 6, among the plurality of module battery management units, the module battery management unit to which a final identifier is assigned may be indicated by a dotted line, and the module battery management unit to which a final identifier is not assigned may be indicated by a solid line. According to the embodiment of FIG. 6, the second module battery management unit 210_2 may be a module battery management unit to which the final identifier fID_2 is assigned.

Figure 6A:
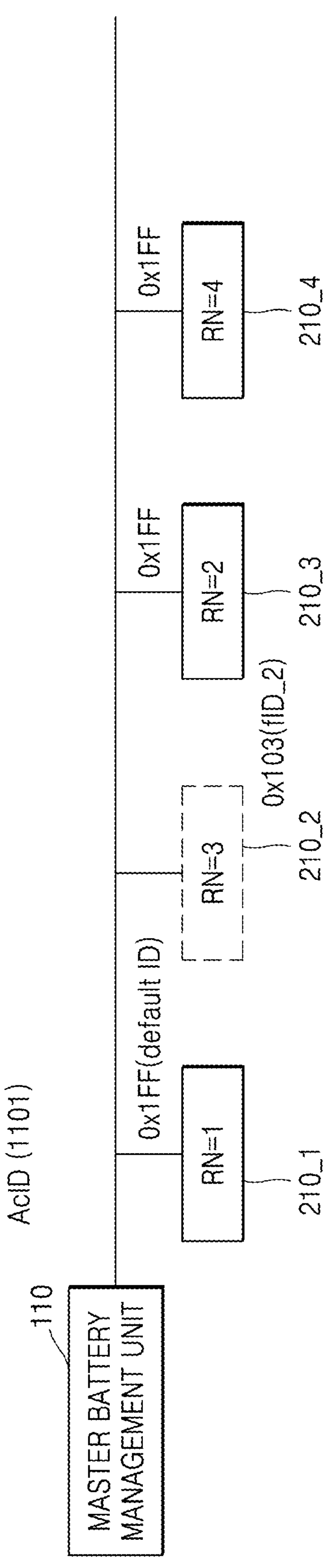
FIG. 6A is a block diagram showing an example of selecting a random number according to an identifier assignment command of the master battery management unit according to a continuing embodiment of FIG. 5.

FIG. 6A schematically shows an example of selecting a random number according to an identifier assignment command of a master battery management unit according to a continuing embodiment of FIG. 5.

Referring to FIG. 6A, the master battery management unit 110 may transmit an identifier assignment command AcID including '1101' as assignable identifier information to four module battery management units 210_1 to 210 4. The four module battery management units 210_1 to 210_4 check whether the final identifier has been assigned in response to the identifier assignment command ACID, and if the final identifier is not assigned, may randomly select one number among assignable identification numbers. The identifier assignment command AcID may include assignable identifier information (e.g., '1101') including a plurality of bits. Bits having a first value (e.g., 0) among the plurality of bits may represent numbers assigned as final identifiers to at least one other module battery management unit among other module battery management units. Bits having a second value (e.g., 1) among the plurality of bits may represent assignable identification numbers. According to one embodiment, assignable identification numbers may be represented in ascending order of natural numbers (natural numbers from 1) from the left bit among a plurality of bits included in assignable identifier information. For example, according to the identifier assignment command AcID including '1101' as assignable identifier information, assignable identification numbers may be 1, 2, or 4. According to another embodiment, assignable identification numbers may represent assignable identification numbers in descending order from the left bit among a plurality of bits. It is possible to indicate assignable identification numbers in ascending order from the right bit among a plurality of bits. For example, according to the identifier assignment command including '1101' as assignable identifier information, assignable identification numbers may be 1, 3, and 4.

Assignable identification numbers in FIG. 6 are shown as an example in ascending order of natural numbers from the left bit among a plurality of bits. According to one embodiment, the assignable identification numbers according to the identifier assignment command ('1101', AcID) of FIG. 6A are '1, 2 and 4', which may be a command to randomly select one number among the assignable identification numbers for each of the module battery management units 210 and assign the one number as a temporary identifier. According to FIG. 6A, since the second module battery management unit 210_2 assigns '0x103' as the final identifier fID_2, the three module battery management units 210_1, 210_3, and 210_4 to which the final identifier fID is not assigned may randomly select one number among assignable identification numbers '1, 2, and 4'. For example, in FIG. 6A, according to the identifier assignment command AcID in which each module battery management unit 210 includes '1101' as assignable identifier information, the first module battery management unit 210_1 may randomly select 1, the third module battery management unit 210_3 may select 2, and the fourth module battery management unit 210_4 may select 4 as an identification number RN.

Figure 6B:
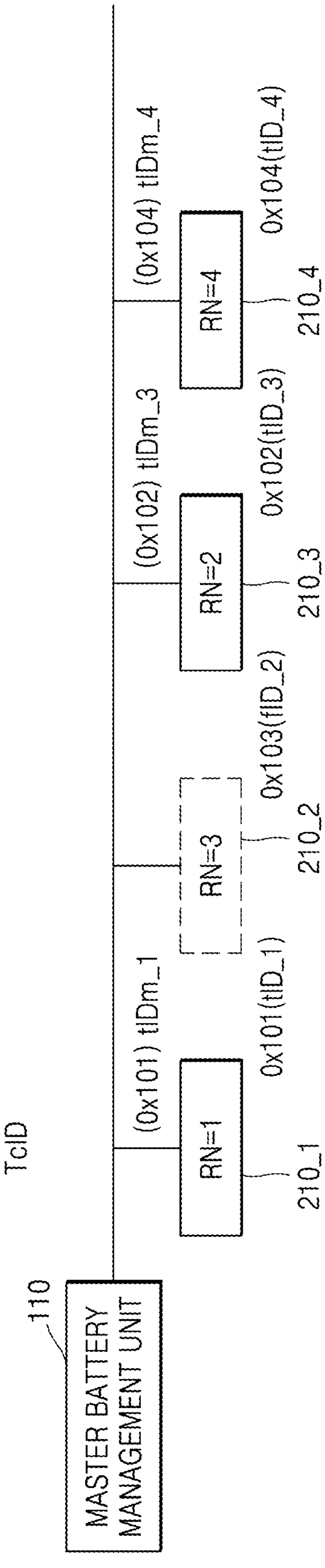
FIG. 6B is a block diagram showing an example of assigning a temporary identifier according to an identifier transmission command of the master battery management unit according to a continuing embodiment of FIG. 5.

FIG. 6B schematically shows an example of assigning a temporary identifier according to an identifier transmission command of a master battery management unit according to a continuing embodiment of FIG. 5.

Referring to FIG. 6B, In FIG. 6A, as the three module battery management units 210_1, 210_3, and 210_4 randomly select identification numbers RN, the first module battery management unit 210_1 may assign '0x101', the third module battery management unit 210_3 may assign '0x102', and the fourth module battery management unit 210_4 may assign '0x104' as temporary identifiers tID, respectively.

The master battery management unit 110 may transmit an identifier transmission command TcID to the module battery management units 210. The module battery management units 210 may transmit the first message tIDm including the assigned temporary identifier tID or final identifier fID through the serial communication bus. The first module battery management unit 210_1 transmits a first message tIDm_1 including 0x101' as a temporary identifier tID_1, the second module battery management unit 210_2 transmits a first message tIDm_2 including '0x103' as a final identifier fID_2, the third module battery management unit 210_3 transmits a first message tIDm_3 including '0x102' as a temporary identifier tID_3, and the fourth module battery management unit 210_4 transmits a first message tIDm_4 including '0x104' as a temporary identifier tID_4 through a serial communication bus.

Each of the module battery management units 210 may receive the first message tIDm_1 to tIDm_4 from each other through a serial communication bus, and check the temporary identifiers '0x101', '0x102', and '0x104' and the final identifier '0x103' included in the first message tIDm_1 to tIDm 4.

Figure 6C:
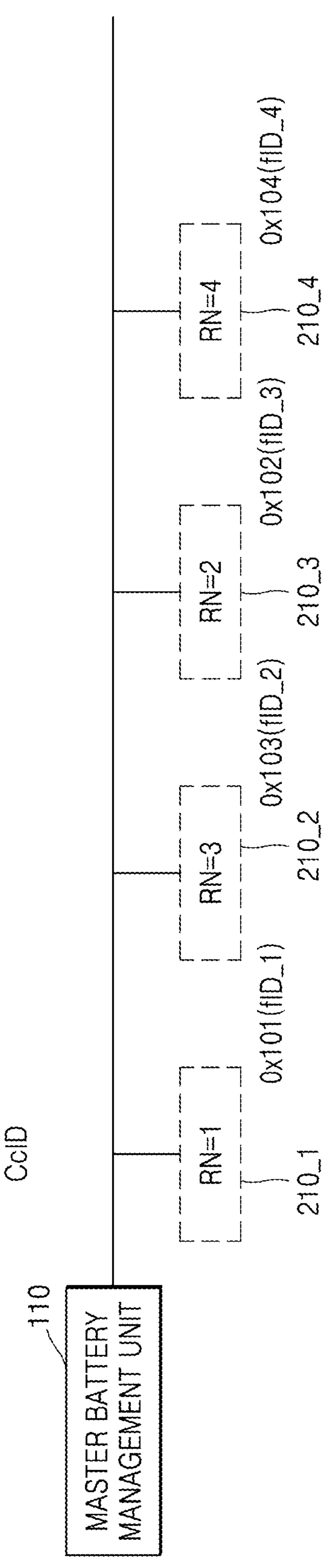
FIG. 6C is a block diagram showing an example of a battery system according to an identifier comparison command of the master battery management unit according to a continuing embodiment of FIG. 5.

FIG. 6C schematically shows an example of a battery system according to an identifier comparison command of a master battery management unit according to a continuing embodiment of FIG. 5.

Referring to FIG. 6C, the master battery management unit 110 may transmit an identifier comparison command CcID to the module battery management units 210. In response to an identifier comparison command CcID, each of the module battery management units 210 may compare whether its own temporary identifier is duplicated with identifiers of other module battery management units. According to FIG. 6C, since the first module battery management unit 210_1 assigns '0x101'(tID_1), the third module battery management unit 210_3 assigns '0x102'(tID_3), and the fourth module battery management unit 210_4 assigns '0x104' (tID_4) as temporary identifiers tID, identifiers included in each of the first messages tIDm_1 to tIDm_4 do not overlap. The first module battery management unit 210_1 may assign '0x101' as the final identifier fID_1, the third module battery management unit 210_3 may assign '0x102' as the final identifier fID_3, and the fourth module battery management unit 210_4 may assign '0x104' as the final identifier fID_4.

Figure 6D:
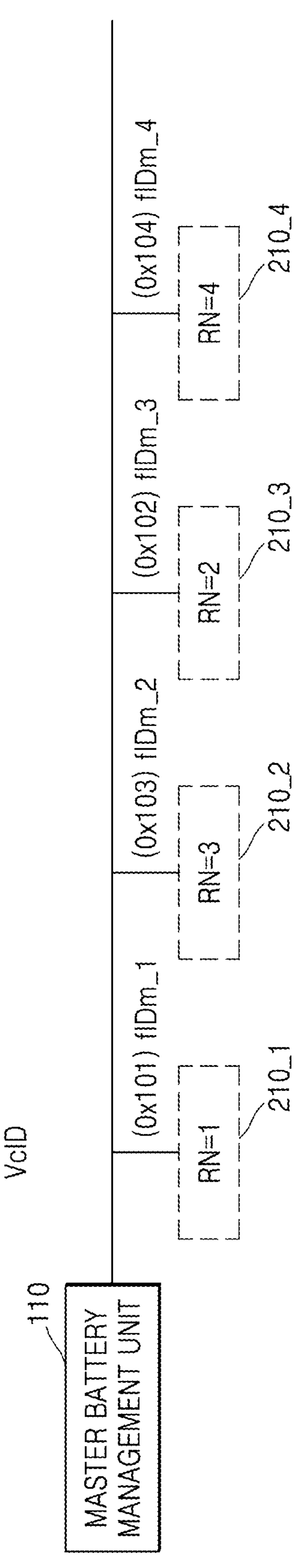
FIG. 6D is a block diagram showing an example of assigning a final identifier according to an identifier check command of the master battery management unit according to a continuing embodiment of FIG. 5.

FIG. 6D schematically shows an example of assigning a final identifier according to an identifier check command of a master battery management unit according to a continuing embodiment of FIG. 5.

Referring to FIG. 6D, the master battery management unit 110 may transmit an identifier check command VcID to the four module battery management units 210_1 to 210_4. The master battery management unit 110 may receive the second message fIDm including the final identifier fIDm from the module battery management unit to which the final identifier fID is assigned. According to FIG. 6D, the first module battery management unit 210_1 may transmit the second message fIDm_1 including '0x101' as the final identifier fID_1, the second module battery management unit 210_2 may transmit a second message fIDm_2 including '0x103' as the final identifier fID_2, the third module battery management unit 210_3 may transmit the second message fIDm_3 including '0x102' as the final identifier fID_3, and the fourth module battery management unit 210_4 may transmit the second message fIDm_4 including '0x104' as the final identifier fID_4 to the master battery management unit 110 through a serial communication bus. Since the master battery management unit 110 has received four second messages fIDm_1 to fIDm_4 from all of the four module battery management units 210_1 to 210_4, it is determined that the final identifier fID is assigned to all of the module battery management units 210_1 to 210_4, and the identifier assignment operation may be terminated.

While the inventive concept has been particularly shown and described with reference to embodiments thereof, it will be understood that various changes in form and details may be made therein without departing from the spirit and scope of the following claims.

Example embodiments have been disclosed herein, and although specific terms are employed, they are used and are to be interpreted in a generic and descriptive sense only and not for the purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of operating a module battery management unit connected to a master battery management unit and at least one other module battery management unit through a serial communication bus, the method comprising:
 receiving an identifier assignment command including assignable identifier information from the master battery management unit;
 randomly selecting one number from among assignable identification numbers according to the assignable identifier information in response to the identifier assignment command, and assigning the selected number as a temporary identifier;
 transmitting a first message including the temporary identifier through the serial communication bus in response to an identifier transmission command received from the master battery management unit;
 receiving messages transmitted by the at least one other module battery management unit in response to the identifier transmission command, and checking identifiers of the at least one other module battery management unit from the messages;
 comparing the temporary identifier with identifiers of the at least one other module battery management unit in response to an identifier comparison command received from the master battery management unit; and
 assigning the temporary identifier as a final identifier if the temporary identifier does not overlap with identifiers of the at least one other module battery management unit.

2. The method as claimed in claim 1, further comprising transmitting a second message including the final identifier to the serial communication bus in response to an identifier check command from the master battery management unit.

3. The method as claimed in claim 1, further comprising not assigning a final identifier in response to the identifier check command if the temporary identifier overlaps with identifiers of the at least one other module battery management unit.

4. The method as claimed in claim 1, wherein the assignable identifier information comprises a plurality of bits, and the bits having a first value, from among the plurality of bits, indicate numbers assigned as final identifiers to at least another module battery management unit from among the at least one other module battery management unit.

5. The method as claimed in claim 4, wherein bits having a second value, from among the plurality of bits, indicate the assignable identification numbers.

6. The method as claimed in claim 1, further comprising confirming whether the final identifier was assigned in response to the identifier assignment command, and performing the randomly selecting one number from among the assignable identification numbers only if the final identifier is confirmed as not assigned.

7. The method as claimed in claim 1, wherein the module battery management unit is included in a battery module that includes at least a battery cell, a plurality of terminals electrically coupled to the serial communication bus, and a protection circuit electrically coupling the battery cell and at least one of the plurality of terminals.

8. The method as claimed in claim 7, wherein the module battery management unit detects state information of the battery cell and communicates the state information to the master battery management unit, the state information including at least one of a voltage, a charge current, a discharge current, and a temperature.

9. The method as claimed in claim 1, wherein the master battery management unit includes at least one microcontroller, the at least one microcontroller including a processor and a memory storing instructions for operating the module battery management unit, the instructions being executable in the processor.

10. A method of operating a master battery management unit connected to a plurality of module battery management units through a serial communication bus, the method comprising:
 transmitting a first identifier assignment command including first assignable identifier information indicating assignable identification numbers to the plurality of module battery management units;
 transmitting an identifier transmission command to the plurality of module battery management units;
 receiving messages transmitted by the other module battery management units in response to the identifier transmission command;

sequentially transmitting an identifier comparison command and an identifier check command to the plurality of module battery management units;

receiving messages transmitted by at least some of the module battery management units to which a final identifier is assigned, from among the plurality of module battery management units, in response to the identifier check command, and checking final identifiers of the at least some of the module battery management units from the messages; and generating second assignable identifier information excluding identification numbers corresponding to final identifiers of the at least some module battery management units from the assignable identification numbers.

11. The method as claimed in claim 10, further comprising transmitting a second identifier assignment command including the second assignable identifier information to the plurality of module battery management unit.

12. The method as claimed in claim 11, further comprising, responsive to transmitting the identifier check command, terminating an identifier assignment operation if the number of messages received from the plurality of module battery management units is equal to the number of the plurality of module battery management units.

13. The method as claimed in claim 11, wherein the first and second assignable identifier information each comprise a plurality of bits, and the bits having a first value, from among the plurality of bits, indicate identification numbers corresponding to final identifiers of at least some module battery management units to which the final identifiers are assigned, from among the plurality of module battery management units.

14. The method as claimed in claim 13, wherein bits having a second value, from among the plurality of bits, indicate identification numbers that can be assigned by at least some module battery management units to which the final identifier is not assigned, from among the plurality of module battery management units.

15. A battery system comprising:

a plurality of module battery management units respectively connected to nodes of a serial communication bus, each of the plurality of module battery management units configured to randomly select one number from among assignable identification numbers according to assignable identifier information in response to an identifier assignment command received, and to assign the selected number as a temporary identifier; and a master battery management unit connected to a serial communication bus, the master battery management unit configured to transmit an identifier assignment command including the assignable identifier information to the plurality of module battery management units, and to transmit an identifier transmission command to the plurality of module battery management units, the master battery management unit being further configured to transmit an identifier comparison command to the plurality of module battery management units, and to compare the temporary identifier with identifiers of the other module battery management units in response to an identifier comparison command, and if the temporary identifier does not overlap with the identifiers of the other module battery management units, to assign the temporary identifier as a final identifier, wherein each of the plurality of module battery management units is configured to transmit a first message including the temporary identifier in response to the identifier transmission command, receive messages transmitted by the other module battery management units, and check identifiers of the other module battery management units from the messages, wherein the master battery management unit is further configured to transmit an identifier check command to the plurality of module battery management units, and wherein each of the plurality of module battery management units is further configured to transmit a second message including the final identifier in response to the identifier check command.

16. The battery system as claimed in claim 15, further comprising a plurality of battery modules, each of the plurality of battery modules including:

at least one battery cell;

a protection circuit configured to protect the at least one battery cell; and the module battery management unit is further configured to control the protection circuit by monitoring a state of the at least one battery cell.

17. The battery system as claimed in claim 16 wherein the module battery management unit detects state information of the at least one battery cell and communicates the state information to the master battery management unit, the state information including at least one of a voltage, a charge current, a discharge current, and a temperature.

18. The battery system as claimed in claim 16 wherein the protection circuit includes one or more of a charge control switch, a discharge control switch, a main switch, a precharge switch, and a fuse.

19. The battery system as claimed in claim 15, wherein the master battery management unit includes at least one microcontroller, the at least one microcontroller including a processor and a memory storing instructions for operating the module battery management unit, the instructions being executable in the processor.

* * * * *